March 2, 1937.  C. E. MARSHALL  2,072,174
REVERSE GEAR
Filed Feb. 10, 1936  2 Sheets-Sheet 1
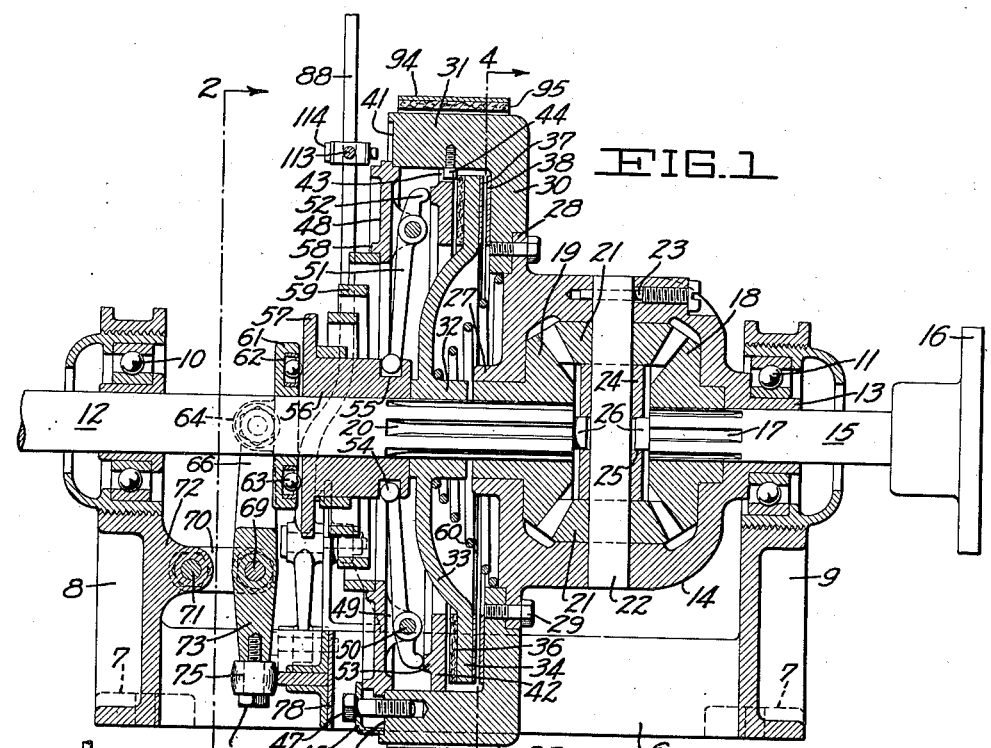
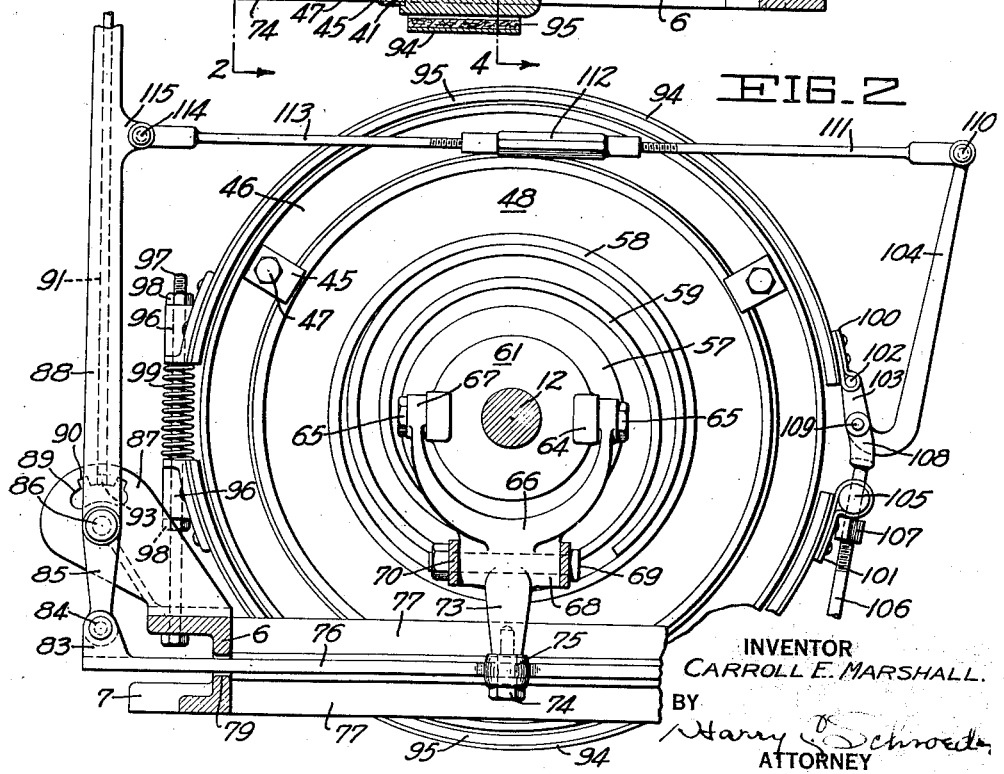
INVENTOR
CARROLL E. MARSHALL.
BY
Harry Schroeder
ATTORNEY

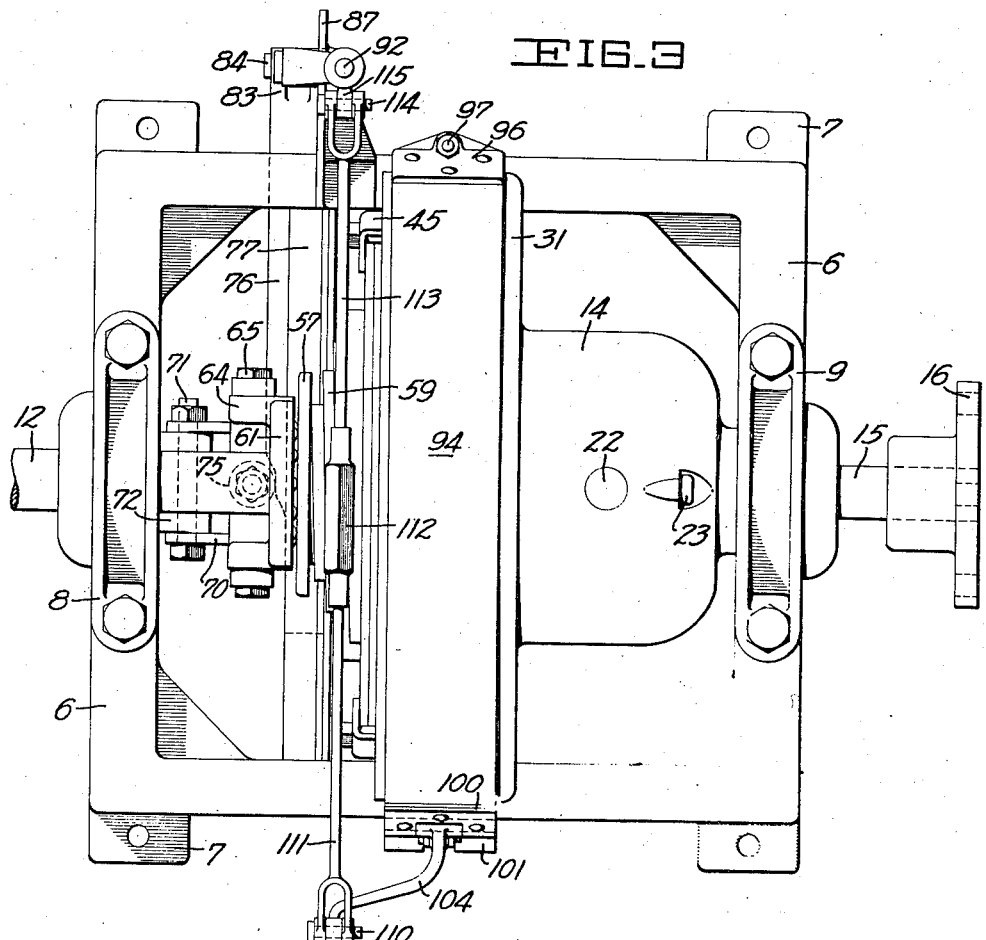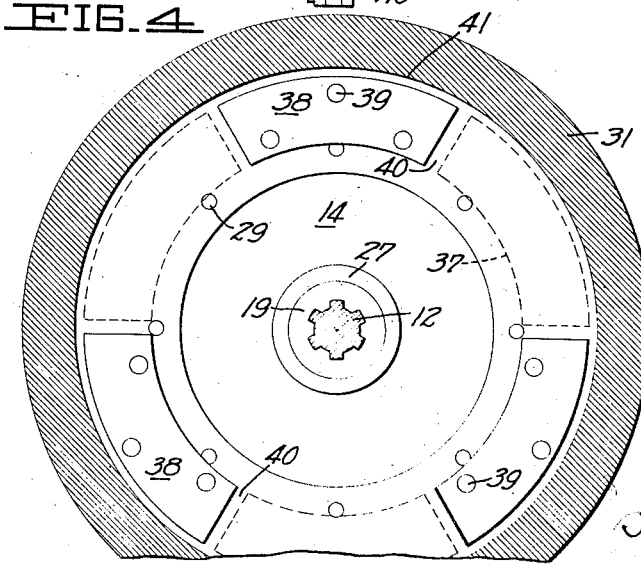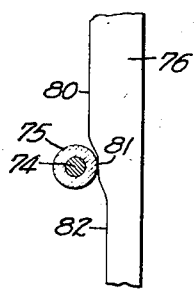

Patented Mar. 2, 1937

2,072,174

UNITED STATES PATENT OFFICE 2,072,174

REVERSE GEAR

Carroll E. Marshall, Richmond, Calif.

Application February 10, 1936, Serial No. 63,047

5 Claims. (Cl. 74—297)

This invention relates to mechanism adapted to be connected to a power driven shaft, by means of which the direction of rotation of the shaft may be selectively changed, and has reference to such a mechanism particularly adapted for use in the propeller shaft of a power driven boat.

It is an object of the invention to provide a reverse gear, having power input and output shafts, in which the rotational speed of the output shaft is at all times, when connected with the input shaft, the same as the rotational speed of the latter shaft.

Another object of the invention is to provide, in a reverse gear of the class described, successively engageable friction and positive clutches whereby, primarily, clutch slippage on overloads is prevented, and secondarily, whereby the rotational speed of the clutch elements are brought by the friction clutch, substantially into synchronism prior to the engagement of the positive clutch so as to lessen shock on the parts when the latter clutch is engaged.

The invention possesses other objects and valuable features some of which, together with the foregoing will be specifically set forth in the description of the invention hereunto annexed. It is to be understood that the invention is not to be limited to the specific form thereof shown and described as various embodiments thereof may be employed within the scope of the appended claims.

Referring to the drawings:

Figure 1 is a vertical sectional view taken longitudinally through a reverse gear mechanism incorporating the principles of my invention.

Figure 2 is a transverse sectional view of the reverse gear; the plane in which the view is taken being indicated by the line 2—2 of Figure 1.

Figure 3 is a top plan view of the reverse gear.

Figure 4 is a transverse sectional view taken on the line 4—4, passing through the clutch of the reverse gear, as indicated in Figure 1.

Figure 5 is a fragmental view, partly in plan and partly in horizontal section, detailing the clutch throw-out cam.

In detail, the reverse gear of my invention comprises a rectangular base 6 provided with apertured lugs 7 by means of which the base may be secured to a support such as a portion of the hull framing of a boat. The base, at opposite ends thereof, is provided with pedestals 8 and 9 fitted respectively with ball-bearings 10 and 11. The bearing 10 rotatably supports a drive shaft 12 which may be connected to any suitable source of power such as the motor of the boat, not shown, and the bearing 11 rotatably supports a sleeve extension 13 of a gear housing 14; the sleeve forming a journal for the driven shaft 15 to the outer end of which is secured a section of a flanged coupling 16 by means of which the shaft 15 may be connected to mechanism to be driven which, in this case, may be the propeller shaft of the boat.

Mounted on the inner end of the driven shaft, by means of splines 17, is a bevel gear 18, and a similar gear 19 is mounted on the inner end of the drive shaft 12 by means of the splines 20. Connecting each of the gears 18 and 19 together is a pair of pinions 21 journaled on a shaft 22 which is fixed in the housing 14 by means of a pin 23. Surrounding the shaft 22 between the inner faces of the pinions 21 is a bearing block 24 provided with a transverse bore 25 in which are journaled the stub extension shafts 26 formed at the inner end of each of the shafts 12 and 15. The gear housing is provided with a sleeve portion 27, in which the hub of the gear 19 is journaled, and with a peripheral flange 28 to which is secured, by means of the screws 29, the flange 30 of an annular drum 31.

It will be seen, upon reference to Figure 1, that the gears 18 and 19 and the pinions 21 provide a planetary gear system, and that if the gear housing 14 is held against rotation, rotation of the drive shaft 12 will cause rotation of the gear 19 and, due to the interconnection of the gears 18 and 19 by the pinions 21 the rotation of the drive shaft will be imparted to the driven shaft 15 but in the opposite direction. It will also be observed that if the gear 19 and the housing 14 are connected together, so as to prevent relative rotation therebetween, the pinions 21 will also be prevented from rotating with the result that the gear 18, and the shaft 15, on which it is mounted, will be forced to rotate in unison with the shaft 12 and in the same direction.

Means are provided for resiliently and positively connecting the shaft 12 and the housing 14 for rotation together. Slidably engaging the splines 20 of the shaft 12 is the hub 32 of a clutch plate 33 provided with a rim 34 to one face of which is attached, preferably by rivets, an annulus of clutch lining 36, and to the other face of which is secured, by the same rivets which secure the lining 36, a plurality, preferably three, of segmental hardened metal plates 37. Plates 38, similar in shape and number to the plates 37 are secured by rivets or screws 39 to the inner face of the drum flange 30. Both sets of plates 37 and 38 are disposed as is clearly shown in Figure 4, radially about a common center, which is the axis of the shaft 12, and each plate is of such a length that a slight spacing 40 exists between it and an adjacent plate.

Disposed in the bore 41 of the drum 31, and slidable axially thereof, is a clutch ring 42 having notches 43 spaced around the periphery thereof which engage the heads of pins 44 secured in the drum so as to prevent relative rotation between the latter and the clutch ring. The inner face of this clutch ring is disposed closely adjacent the face of the lining 36. Secured in the bore of the drum, by lugs 45 mounted on the face 41 of the drum by screws 47, is a plate 48 provided on the inner surface thereof, facing the clutch ring 42, with lugs 49 carrying pins 50 which provide fulcrums for levers 51. Each lever is provided with an outer arm having a rounded end 52 which bears against the top of a circular flange 53 formed on the plate 42, and an inner arm provided at its distal end with a head 54 disposed in the peripheral groove 55 of a sleeve 56 slidably mounted on the shaft 12. The sleeve is provided, at one end thereof, with a flange 57, and between this flange and a circular flange 58, formed on the outer face of the plate 48, is disposed a heavy spirally coiled spring 59. Another coiled spring 60 is disposed between a surface of the clutch plate 33 and that of the housing 14 so as to maintain the clutch plate in disengaged position, as is shown in Figure 1; the outward movement of the plate being limited by the pins 44 which engage the plate near the periphery of the latter.

As mentioned above the positions of the parts indicated in Figure 1 show the clutch mechanism in its disengaged position, that is, the connection between the shaft 12 and the drum 31 is disrupted thereby allowing, when the shaft 12 is rotated, the pinions 21 to planetate freely around the gears 18 and 19 and as a result causing the transmission of no torque to the shaft 15. However as soon as the sleeve 56 is allowed to move axially of the shaft 12, toward the bearing 10, the levers 51 will be moved causing the ring 42 to move toward and engage the lining 36 thereby frictionally engaging the shaft 12 with the drum 31. Since the drum is an integral part of the housing 14, the latter will be prevented from rotating relative to the shaft 12 and consequently the pinions will be prevented from rotating thereby causing the gear 18 and its connected shaft 15 to rotate in synchronism with the shaft 12 and in the same direction.

It will be seen that, by allowing the sleeve 56 to approach closer to the bearing 10, the additional movement imparted to the levers 51 will cause movement of both the ring 42 and the plate 33 toward the drum flange 30 and will effect interengagement of the segmental plates 37 and 38 whereupon the shaft 12 becomes positively locked to the drum and the mechanism is thereby rendered capable of transmitting a greater amount of power since there is no danger of slippage which might occur if the frictional connection between the lining 36 and the face of the ring 42 were depended on.

Another valuable feature afforded by this construction is that, when the clutch elements are in disengaged position, such as illustrated in Figure 1, the rotational speed of the clutch plate 33 will be greater than that of the drum due to the planetary action of the pinions 21 carried by the drum. When the clutch is first frictionally engaged, as was described above, the rotational speeds of the two elements are, since they are both rotating in the same direction, brought substantially into synchronism with the result that when the plates 37 and 38 are meshed together they will do so without clashing thus obviating noise and the creation of severe shocks which would cause undue strain on the parts of the mechanism.

Means are provided for selectively moving the sleeve 56 to different positions axially of the shaft so as to maintain the clutch either in its disengaged position, in a position wherein the clutch is frictionally engaged, or in a position wherein the clutch is positively engaged. Journaled on the shaft 12 immediately adjacent the sleeve 56 is a collar 61 provided with an annular groove 62 in which is disposed a ball thrust bearing 63; the balls of which contact the bottom of the groove 62 and the face of the sleeve of which the flange 57 forms a part. The collar is provided with a pair of diametrically opposed lugs 64 into which are screwed studs 65. A yoke 66 is provided having at the end of each arm thereof an eye 67, which is journaled on the stud 65, a boss 68 bored to receive a bolt 69 journaled in one end of each of a pair of links 70, the other end of each of which is pivotally secured by means of a bolt 71 to a projection 72 of the pedestal 8, and an arm 73 bored and threaded at its lower end to receive a stud 74 upon which is journaled a roller 75.

The periphery of the roller contacts the edge of a cam bar 76 slidably mounted between a pair of angle bars 77 and a backing plate 78 and passing outwardly from the base through an aperture 79 formed in a side member thereof. The ends of each of the angle bars and of the backing plate are secured to the side members of the base in any suitable manner, preferably by welding and the angle bars and backing plate are further welded together at spaced intervals longitudinally thereof to increase their rigidity. As is shown in Figure 5 the edge of the cam bar 76 facing the roller 75 is provided with steps 80, 81 and 82 which, when the bar is moved longitudinally, cause movement of the roller to rock the yoke 66 about its pivotal axis and thereby move the sleeve 56 axially of the shaft.

When the step 80 is opposite the roller, the sleeve 56 will have moved as far to the right, as viewed in Figure 1, as is necessary to disengage the clutch so that the drum will be free of the shaft. The mechanism will now be in neutral, that is, it will be, while the shaft 12 is revolving, transmitting no torque to the shaft 15.

When the cam bar is moved to position the step 81 opposite the roller, the roller will have moved to the right a distance sufficient to bring the clutch ring into contact with the clutch lining whereupon the clutch will be frictionally engaged and the shafts 12 and 15 will rotate in unison.

Further movement of the cam bar will permit additional movement of the roller to the right with the result that the sleeve 56 will approach nearer to the bearing 10 and the clutch ring and plate will move toward the drum flange until the plates 37 and 38 inter-engage whereupon a positive connection between the shafts 12 and 15 will be established enabling the latter to transmit maximum torque without slippage.

Means are provided for manually moving the cam bar and means are provided for securing the cam bar in any of several selected positions. The outer end of the bar is provided with a pair of spaced lugs 83 each apertured to receive a pin 84 upon which is journaled the eye of a lever arm 85 whose upper end is pivotally mounted, by means of a pin 86 in the end of a bracket 87 secured to the side member of the base 6. A lever 88 is formed integrally with the lever arm 85 and extends upwardly therefrom. The bracket 87, adjacent the pivot pin 86, is provided with an arcuate slot 89 whose upper edge is provided with spaced notches 90 positioned to correspond to the different positions of the steps on the cam bar 76. A rod 91 extends upwardly along the lever 88, terminating at its upper end in a push button 92, and at its lower end in a portion turned outwardly therefrom at right angles to provide a dog 93 engageable with the notches 90. A spring, not shown, is provided adjacent the upper end of the rod to urge it upwardly relative to the lever 88 so as to maintain the dog 93 in engagement with a desired notch. It will be seen that by depressing the push button 92 the dog will be disengaged from the notch and the lever 88 may be moved to any one of the several positions indicated, whereupon by releasing the push button to engage the dog, with the notch associated with the selected position, the lever will be securely held in this position.

Means are provided for holding the drum 31 against rotation, when the clutch mechanism is in disengaged position, so as to impart, through the action of the planetary gear system, a reversal of rotation to the shaft 15. Disposed about the periphery of the drum 31 is a pair of arcuate bands 94 each faced with brake lining 95. The length of each band is such that they together cover a substantial portion of the periphery of the drum. One end of each band is provided with a bracket 96 having a bored boss therein which receives a rod 97 threaded and supplied with nuts 98 by means of which the brackets may be brought closer together to adjust the spacing therebetween and the face of the drum, and a spring 99 is interposed between the brackets 96 to maintain the adjustment of the brake bands once it has been fixed. The lower end of the rod 97 is anchored to the side member of the base 6, passing through an aperture therein of such size as will permit rocking of the rod when the brake bands are released and engaged.

The opposite end of each brake band is provided with straps 100 and 101 looped to provide journals respectively for the pin 102, carried by the extension arm 103 of an operating lever 104, and for the pivot pin 105 which is transversely apertured to slidably receive a take-up rod 106 having a nut 107 threaded thereon which provides for axial adjustment of the rod relative to the pivot pin 105. The upper end of the rod is provided with a clevis 108 provided with a pin 109 which is journaled in a boss positioned at the junction of the extension arm 103 and the operating lever 104.

The upper end of the operating lever is provided with an eye which receives a pivot pin 110 engaging the clevised end of a rod 111 whose opposite end is threaded to receive a turnbuckle 112. A rod 113 similar to the rod 111, is also threaded into the opposite end of the turnbuckle and is provided with a clevis engaging the pivot pin 114 secured in a lug 115, projecting from the lever 88. The purpose of the turnbuckle 112 is to provide for adjustment between the movements of the levers 88 and 104 so that the drum brake will be applied at the right instant.

When it is desired to cause a reversal of movement of the shaft 15 with respect to the direction of movement of the shaft 12, the lever 88, Figure 2, is moved as far as possible to the left whereupon the brake will be set and will prevent rotation of the drum and the gear housing 14. This movement of the lever 88 will, of course, cause movement of the cam bar 76 but since the roller 75 is contacting the outer flat surface 80 thereof the setting of the clutch will not be altered from its disengaged position. By holding the housing 14 against rotation it will be observed that planetary movement of the pinions 21 is prevented and consequently the latter being thus held in a fixed position will cause translation of the rotation of the shaft 12 to the shaft 15 in a reversed direction.

The reverse gear just described is surprisingly quiet in operation as the connectable parts, with the exception of the plates 37 and 38, are frictionally engageable and since no counter-rotation exists between the plates they will engage without serious clashing. The mechanism as a whole is very simple in construction thereby permitting easy servicing, and, due to the particular design thereof which eliminates the shock inherent in reverse gears employing jaw clutches, the device of my invention is capable of very efficient service and a longer useful life than those now generally in use.

I claim:

1. In a reverse gear, a pair of shafts, gears fixed for rotation with each of said shafts, a housing journaled on said shafts, a pinion journaled in said housing and meshing with each of said gears, a drum comprising a disk fixed to said housing for rotation therewith and provided with a cylindrical peripheral rim and an axial bore, a clutch disk rotatably mounted with one of said shafts and slidable axially thereof, a ring slidably mounted in said bore, a plurality of levers pivotally mounted on said drum and having one end thereof in contact with said ring, a sleeve slidably mounted on one of said shafts and pivotally engaging the other end of said levers, a plurality of engageable elements on a surface of said clutch disk and on a surface of said drum disk, a lever operatively connected with said sleeve and provided, at one end thereof, with a roller, and a member engageable with, and movable relatively with respect to, said roller for moving said sleeve lever.

2. In a reverse gear, a pair of shafts, gears fixed for rotation with each of said shafts, a housing journaled on said shafts, a pinion journaled in said housing and meshing with each of said gears, a drum comprising a disk fixed to said housing for rotation therewith and provided with a cylindrical peripheral rim and an axial bore, a clutch disk rotatably mounted with one of said shafts and slidable axially thereof, a ring slidably mounted in said bore, a plurality of levers pivotally mounted on said drum and having one end thereof in contact with said ring, a sleeve slidably mounted on one of said shafts and pivotally engaging the other end of said levers, a plurality of engageable elements on a surface of said clutch disk and on a surface of said drum disk, and means for moving said sleeve axially of said shaft to move said ring into engagement with said clutch disk and the engageable elements of said clutch disk into engagement with the corresponding elements of said drum disk, said means comprising a lever operatively connected at one end thereof with said sleeve, and provided with a roller at the other end thereof, and a slidable member having a cam surface thereon contacting said roller whereby said lever will be moved upon movement of said slidable member.

3. In a reverse gear, a pair of shafts, gears fixed for rotation with each of said shafts, a housing journaled on said shafts, a pinion journaled in said housing and meshing with each of said gears, a drum comprising a disk fixed to said housing for rotation therewith and provided with a cylindrical peripheral rim and an axial bore, a clutch disk rotatably mounted with one of said shafts and slidable axially thereof, a ring slidably mounted in said bore, a plurality of levers pivotally mounted on said drum and having one end thereof in contact with said ring, a sleeve slidably mounted on one of said shafts and pivotally engaging the other end of said levers, a plurality of engageable elements on a surface of said clutch disk and on a surface of said drum disk, and means for moving said sleeve axially of said shaft to move said ring into engagement with said clutch disk and the engageable elements of said clutch disk into engagement with the corresponding elements of said drum disk, said means comprising a lever operatively connected at one end thereof with said sleeve, and provided with a roller at the other end thereof, a slidable bar having on one edge thereof a plurality of surfaces lying in different planes, each of said surfaces being capable of successively contacting said roller to move said lever to different angular positions, and a manually operable lever pivotally connected to said slidable bar by means of which said bar may be moved.

4. In a reverse gear, a pair of shafts, gears fixed for rotation with each of said shafts, a housing journaled on said shafts, a pinion journaled in said housing and meshing with each of said gears, a drum comprising a disk fixed to said housing for rotation therewith and provided with a cylindrical peripheral rim and an axial bore, a clutch disk rotatably mounted with one of said shafts and slidable axially thereof, a ring slidably mounted in said bore, a plurality of levers pivotally mounted on said drum and having one end thereof in contact with said ring, a sleeve slidably mounted on one of said shafts and pivotally engaging the other end of said levers, a plurality of engageable elements on a surface of said clutch disk and on a surface of said drum disk, and means for moving said sleeve axially of said shaft to move said ring into engagement with said clutch disk and the engageable elements of said clutch disk into engagement with the corresponding elements of said drum disk, said means comprising a lever operatively connected at one end thereof with said sleeve, and provided with a roller at the other end thereof, a slidable bar having on one edge thereof a plurality of surfaces lying in different planes, each of said surfaces being capable of successively contacting said roller to move said lever to different angular positions, a manually operable lever pivotally connected to said slidable bar by means of which said bar may be moved to a selected position, and means for latching said manually operable lever in any of a plurality of positions for maintaining said slidable bar in a selected position.

5. In a reverse gear, a pair of shafts, gears fixed for rotation with each of said shafts, a housing journaled on said shafts, a pinion journaled in said housing and meshing with each of said gears, a drum comprising a disk fixed to said housing for rotation therewith and provided with a cylindrical peripheral rim and an axial bore, a clutch disk rotatably mounted with one of said shafts and slidable axially thereof, a ring slidably mounted in said bore, a plurality of levers pivotally mounted on said drum and having one end thereof in contact with said ring, a sleeve slidably mounted on one of said shafts and pivotally engaging the other end of said levers, a plurality of engageable elements on a surface of said drum disk and on a surface of said clutch disk, means for selectively positioning said sleeve axially of said shaft to hold said clutch disk out of engagement with said ring and said drum disk, to hold said clutch plate in engagement with said ring, or to hold said ring in engagement with said clutch disk and the engageable elements of said clutch disk in engagement with the elements of said drum, said means comprising a lever operatively connected at one end thereof with said sleeve, and provided with a roller at the other end thereof, a slidable bar having on one edge thereof a plurality of surfaces lying in different planes, each of said surfaces being capable of successively contacting said roller to move said lever to different angular positions, a manually operable lever pivotally connected to said slidable bar by means of which said bar may be moved, a brake band surrounding said drum, a linkage system for contracting said brake band to engage said drum, said linkage system including an operating lever, and means connecting said operating lever and said manually operable lever for simultaneous movement together whereby when said manually operable lever is moved to a selected position said brake will be set to prevent rotation of said drum.

CARROLL E. MARSHALL.